(12) United States Patent
Chen

(10) Patent No.: US 9,337,733 B2
(45) Date of Patent: May 10, 2016

(54) ADAPTIVE PRE-CHARGE VOLTAGE CONVERTER

(71) Applicant: Anpec Electronics Corporation, Hsin-Chu (TW)

(72) Inventor: Chih-Ning Chen, Taipei (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 239 days.

(21) Appl. No.: 14/281,908

(22) Filed: May 20, 2014

(65) Prior Publication Data

US 2015/0270778 A1    Sep. 24, 2015

(30) Foreign Application Priority Data

Mar. 19, 2014    (TW) .............................. 103110341 A

(51) Int. Cl.
  *H02M 1/088*    (2006.01)
  *H02M 3/158*    (2006.01)
  *H02M 1/36*    (2007.01)

(52) U.S. Cl.
  CPC ................ *H02M 3/158* (2013.01); *H02M 1/36* (2013.01); *H02M 3/1588* (2013.01); *Y02B 70/1466* (2013.01)

(58) Field of Classification Search
  CPC ....... H02M 1/08; H02M 1/088; H02M 3/156; H02M 3/158; H02M 3/1588
  USPC .................................. 323/222, 271, 282, 284
  See application file for complete search history.

(56) References Cited

U.S. PATENT DOCUMENTS

| 5,625,279 | A | 4/1997 | Rice |
| 5,721,483 | A | 2/1998 | Kolluri |
| 5,929,615 | A | 7/1999 | D'Angelo |
| 7,084,611 | B2 | 8/2006 | Kirchner |
| 7,977,926 | B2 | 7/2011 | Williams |
| 8,502,511 | B1 | 8/2013 | Kung |
| 2005/0088212 | A1 | 4/2005 | Leith |
| 2012/0105030 | A1* | 5/2012 | Chen ..................... H02M 3/156 323/271 |
| 2013/0063106 | A1* | 3/2013 | Nishida ................. H02M 3/156 323/271 |
| 2013/0063108 | A1* | 3/2013 | Nishida ................. H02M 3/156 323/271 |
| 2015/0270778 | A1* | 9/2015 | Chen ..................... H02M 3/158 323/271 |
| 2015/0381041 | A1* | 12/2015 | Chang ................... H02M 3/156 323/271 |
| 2016/0036326 | A1* | 2/2016 | Sreenivas .............. H02M 3/158 323/271 |

FOREIGN PATENT DOCUMENTS

TW    200810359    2/2008
TW    201240352    10/2012

* cited by examiner

*Primary Examiner* — Jeffrey Sterrett
(74) *Attorney, Agent, or Firm* — Winston Hsu; Scott Margo

(57) ABSTRACT

A voltage converting device includes a feedback module, for generating a comparing signal according to a feedback voltage and a reference voltage; a pulse-width-modulation module, for generating a driving signal according to comparing signal; a voltage-converting module including a low-side switch for controlling a connection between a node and ground according to driving signal, a high-side switch for controlling a connection between the node and an output end according to a control signal, an inductor coupled between the node and an input end, a feedback-voltage-generating unit for generating feedback voltage according to an output voltage of output end and a ratio, an adaptive current-generating unit for generating a current signal according to an adjusting signal, and a control unit for selecting driving signal or current signal as the control signal according to output voltage and an input voltage; and a current-adjusting module for generating adjusting signal according to comparing signal.

6 Claims, 4 Drawing Sheets

ADAPTIVE PRE-CHARGE VOLTAGE CONVERTER

BACKGROUND OF THE INVENTION

1. Field of the Invention

The present invention relates to a voltage converting device, and more particularly, to a voltage converting device capable of adaptively adjusting the pre-charge current according to the output loading.

2. Description of the Prior Art

Electronic devices are usually comprised of many different elements, which operate with different operational voltages. It is necessary to utilize different DC-DC voltage converters in order to achieve different voltage modulations, such as modulation for raising voltage values or degradation voltage values, and to maintain predetermined voltage values. Many types of DC-DC voltage converters which are widely employed are derived from the buck/step down converter or the boost/step up converter. The buck converter can decrease an input DC voltage to a default voltage level, and the boost converter can increase the input DC voltage to another default voltage level. Both the buck and boost-type converters have been varied and modified to different system architectures and requirements.

In the conventional boost converter, an output voltage of the output end of the boost converter must be greater than the input voltage of an input voltage of the input end for allowing the boost converter to work normally. Thus, the conventional boost converter needs to perform a charging process when starting operating, for making the output voltage of the output end become greater than the input voltage of the input end before entering the normal operation process. However, if the loading coupled to the output end of the boost converter exceeds the loading capability of being driven by the predetermined charge current in the boost converter, the charging process may work abnormally, resulting in the output voltage cannot exceed the input voltage. As can be seen from the above, the prior art needs to be improved.

SUMMARY OF THE INVENTION

In order to solve the above problem, the present invention provides a voltage converting device capable of adaptively adjusting the charging current, which is utilized for increasing the output voltage while starting operating, according to the loading of the output end of the voltage converter.

The present invention discloses a voltage converting device, comprising a feedback module, for generating a comparing signal according to a feedback voltage and a reference voltage; a pulse-width-modulation module, for generating a driving signal according to comparing signal; a voltage converting module comprising: a low-side switch for controlling a connection between a node and ground according to driving signal; a high-side switch for controlling a connection between the node and an output end according to a control signal; an inductor coupled between the node and an input end; a feedback voltage generating unit for generating feedback voltage according to an output voltage of output end and a ratio; an adaptive current generating unit for generating a current signal according to an adjusting signal; and a control unit for selecting driving signal or current signal as the control signal according to output voltage and an input voltage; and a current adjusting module for generating the adjusting signal according to the comparing signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
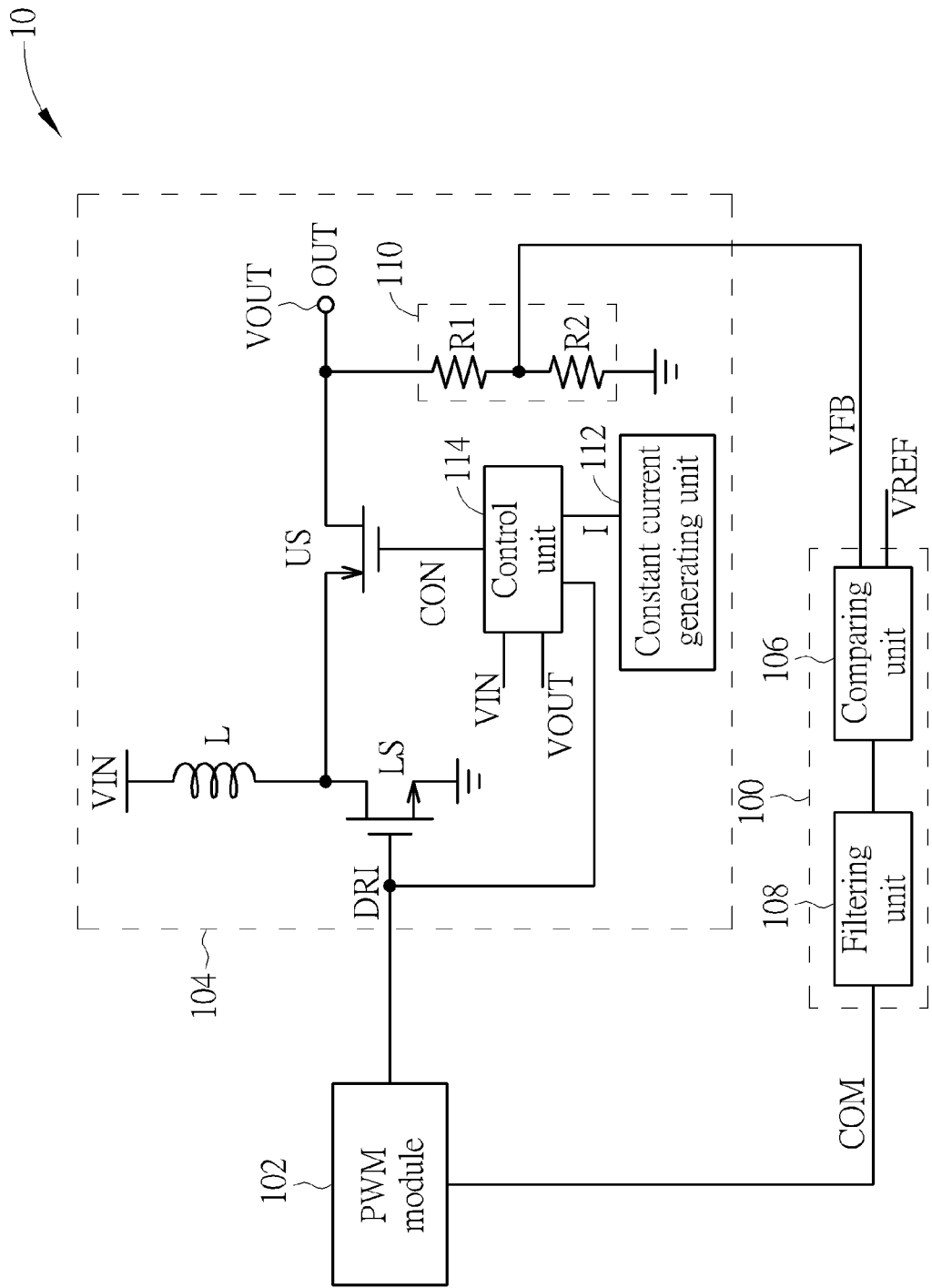
FIG. 1 is a schematic diagram of a voltage converting device according to an example of the present invention.

Please refer to FIG. 1, which is a schematic diagram of a voltage converting device 10 according to an example of the present invention. The voltage converting device 10 is utilized for converting an input voltage VIN to an output voltage VOUT. In an example, the voltage converting device 10 is a boost direct-current (DC) to DC converter. As shown in FIG. 1, the voltage converting device 10 comprises a feedback module 100, a pulse-width-modulation (PWM) module 102 and a voltage converting module 104. The Feedback module 100 comprises a comparing unit 106 and a filtering unit 108 for generating a comparing signal COM according to the relative magnitude between a feedback voltage VFB and a reference voltage VREF. The PWM module 102 is coupled to the feedback module 100, for generating a driving signal DRI according to the comparing signal COM. The voltage converting module 104 is coupled to the PWM module 102 and the feedback module 100 and comprises a low-side switch LS, a high-side switch US, an inductor L, a feedback voltage generating unit 110, a constant current generating unit 112 and a control unit 114. The voltage converting module 104 is utilized for increasing the output voltage VOUT to exceed the input voltage VIN when the voltage converting device 10 starts operating and then controlling the low-side switch LS and the high-side switch US according to the driving signal DRI, to increase the output voltage VOUT to a predetermined voltage VTAR. The voltage converting module 104 further generates the feedback voltage VFB according to the output voltage VOUT and the ratio between the resistors R1 and R2 of the feedback voltage generating unit 110, for making the output voltage VOUT stable at the predetermined voltage VTAR via the feedback path consisted of the feedback module 100, the PWM module 102 and the voltage converting module 104.

In detail, the control unit 114 of the voltage converting module 104 selects one of the driving signal DRI and the current signal I generated by the constant current generating unit 112 as the control signal CON outputted to the high-side switch US according to the relative magnitude between the output voltage VOUT and the input voltage VIN. When the voltage converting device 10 begins operating, the input voltage VIN is greater than the output voltage VOUT and the voltage converting device 10 enters a pre-charge mode. The control unit 114 outputs the current signal I as the control signal CON for conducting the high-side switch US and making the input voltage VIN charging the output end OUT (i.e. increasing the output voltage VOUT). Next, the voltage converting device 10 enters a PWM mode when the output voltage VOUT exceeds the input voltage VIN. The control unit 114 changes to output the driving signal as the control signal CON. Since the driving signal DRI is generated by the feedback path consisted of the feedback module 100, the PWM module 102 and the voltage converting module 104, the output voltage VOUT is increased to and regulated at the predetermined voltage VTAR via controlling the high-side switch US and the low-side switch LS according to the driving signal DRI. The detail operations of the feedback path consisted of the feedback module 100, the PWM module 102 and the voltage converting device 104 should be well known to those with ordinary skill in the art, and are not narrated herein for brevity.

However, the current signal I equips with the constant current value results that the performance and the operation of the voltage converting device 10 may be affected when the loading coupled to the output end OUT changes. For example, when the loading coupled to the output end OUT decreases, the current signal I with the constant current value results in the voltage converting device 10 consumes additional power consumption and the overshoot phenomenon occurs on the output voltage VOUT of the output end OUT; and when the loading coupled to the output end OUT increases, the current signal I with the constant current value maybe not capable of increasing the output voltage VOUT and making the output voltage VOUT exceeding the input voltage VIN, resulting the voltage converting device 10 works abnormally.

The present invention further discloses a voltage converting device capable of adjusting the charging current, which is used for increasing the output voltage when starting operating (e.g. the current signal I shown in FIG. 1), according to the output voltage and the loading of the output end. Please refer to FIG. 2, which is a schematic diagram of a voltage converting device 20 according to an example of the present invention. The voltage converting device 20 is similar to the voltage converting device 10 shown in FIG. 1, thus the components and signal with the similar functions use the same symbols. Different from the voltage converting device 10, the voltage converting device 20 adds a current adjusting module 216 for generating an adjusting signal ADJ according to the comparing signal to the adaptive current generating unit 212, to adjust the current value of the current signal I according to the loading coupled to the output end OUT. In an example, the current value of the current signal I increases when the comparing signal COM indicates that the difference between the feedback voltage VFB (which is proportional to the output voltage VOUT) and the reference voltage VREF becomes greater; and the current value of the current signal I decreases when the comparing signal COM indicates that the difference between the feedback voltage VFB and the reference voltage VREF becomes smaller. That is, the current value of the current signal I is proportional to the voltage difference between the feedback voltage VFB and the reference voltage VREF (i.e. the comparing signal COM). In such a condition, the charging current, which is used for increasing the output voltage VOUT from the input voltage VIN when the voltage converting device 20 is turned on, changes according to the loading coupled to the output end OUT and the current adjusting module 216 adjusts the current value of the current signal I according to the voltage difference between the feedback voltage VFB (proportional to the output voltage VOUT) and the reference voltage VREF. In other words, the current adjusting module 216 adjusts the current value of the current signal I according to the output voltage VOUT and the loading coupled to the output end, for assuring that the output voltage VOUT can be increased to the input voltage VIN. After the output voltage VOUT exceeds the input voltage VIN, the voltage converting device 20 enters into the PWM mode and makes the output voltage VOUT reach the predetermined voltage VTAR.

Please note that, since the current adjusting module 216 adjusts the current value of the current signal I according to the comparing signal COM generated by the feedback path consisted of the feedback module 100, the PWM module 102 and the voltage converting module 104, the voltage converting device 20 only needs to add the current adjusting module 216 (e.g. a Gm amplifier) to achieve the goal of adaptively adjusting the current value of the current signal I. Further, since the control of generating the driving signal DRI and adjusting the current signal I by the current adjusting module 216 are both from the comparing signal COM, the process of the voltage converting device 20 transits from the pre-charge mode to the PWM mode is stable and the overshoot phenomenon on the output voltage VOUT can be avoided.

Figure 2:
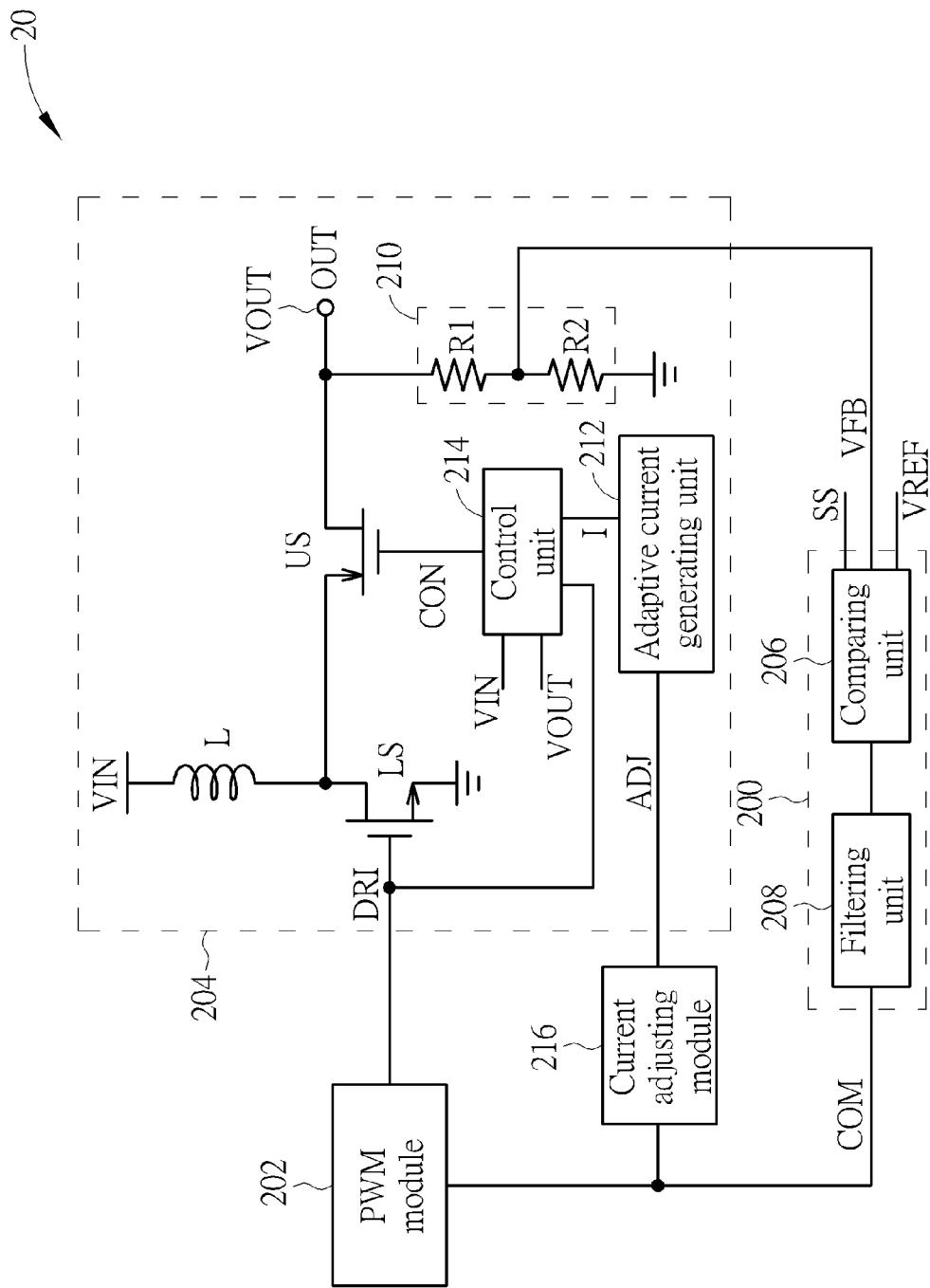
FIG. 2 is a schematic diagram of another voltage converting device according to an example of the present invention.
Figure 3:
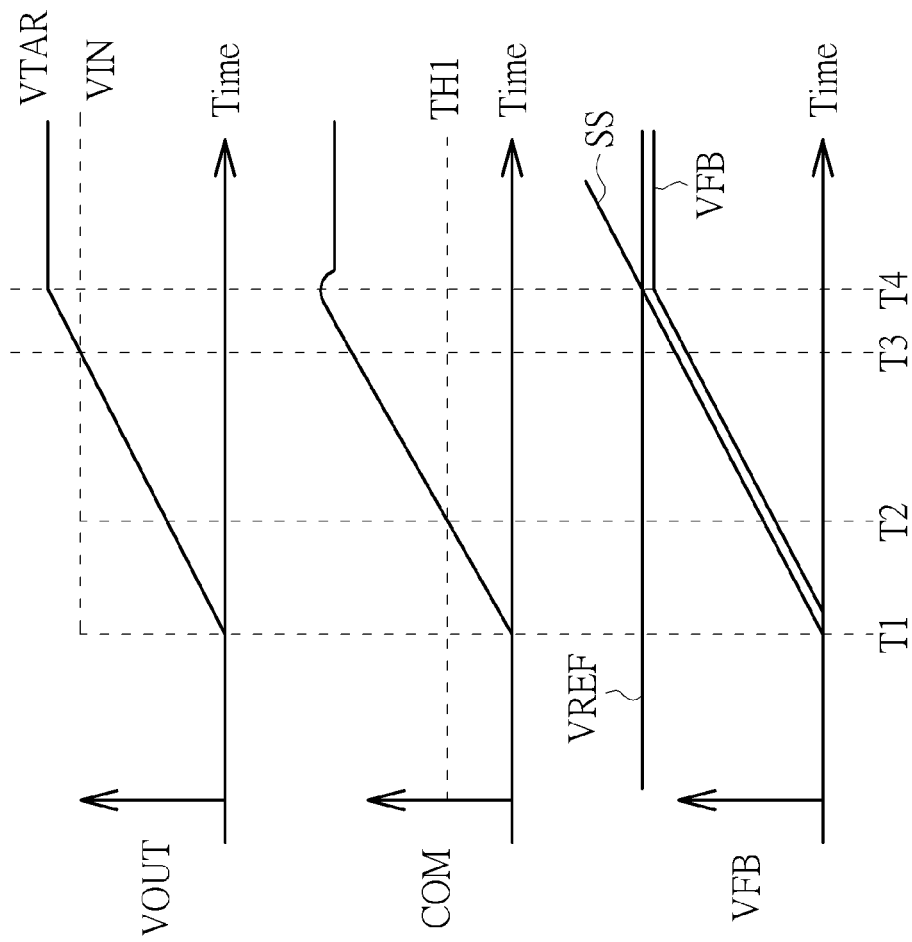
FIG. 3 is a schematic diagram of related signals when the voltage converting device shown in FIG. 2 operates.

As to the detailed operations of the voltage converting device 20 shown in FIG. 2 please refer to FIG. 3, which is a schematic diagram of related signals when the voltage converting device 20 operates. In order to prevent the components of the voltage converting device 20 from being damaged by the peak current, the comparing unit 206 further receives a soft start signal SS and selects the signal with the smaller voltage between the soft start signal SS and the reference voltage VREF to be the signal comparing with the feedback voltage VFB. When the voltage converting device 20 starts operating at a time T1, the reference voltage VREF is greater than the soft start signal SS and the comparing unit 206 compares the soft start signal SS with the feedback voltage VFB for generating the comparing signal COM. The output voltage VOUT is 0 at this time, thus the comparing signal COM increases with the soft start signal SS from 0. At a time T2, the comparing signal COM reaches a threshold voltage TH1 and the current adjusting module 216 constantly instructs the adaptive current generating unit 212 to generate the current signal I via the adjusting signal ADJ. Since the output voltage VOUT is still smaller than the input voltage VIN, the control unit 214 outputs the current signal I as the control signal CON for conducting the high-side switch US and the input voltage VIN charges the output end OUT. After the output voltage VOUT is equal to and greater than the input voltage VIN at a time T3, the voltage converting device 20 enters into the PWM mode. At a time T4, the soft start signal SS exceeds the reference voltage VREF and the feedback module 200 compares the reference voltage VREF with the feedback voltage VFB for adjusting the comparing signal COM. The output voltage VOUT gradually approaches and becomes stable at the predetermined voltage VTAR.

Figure 4:
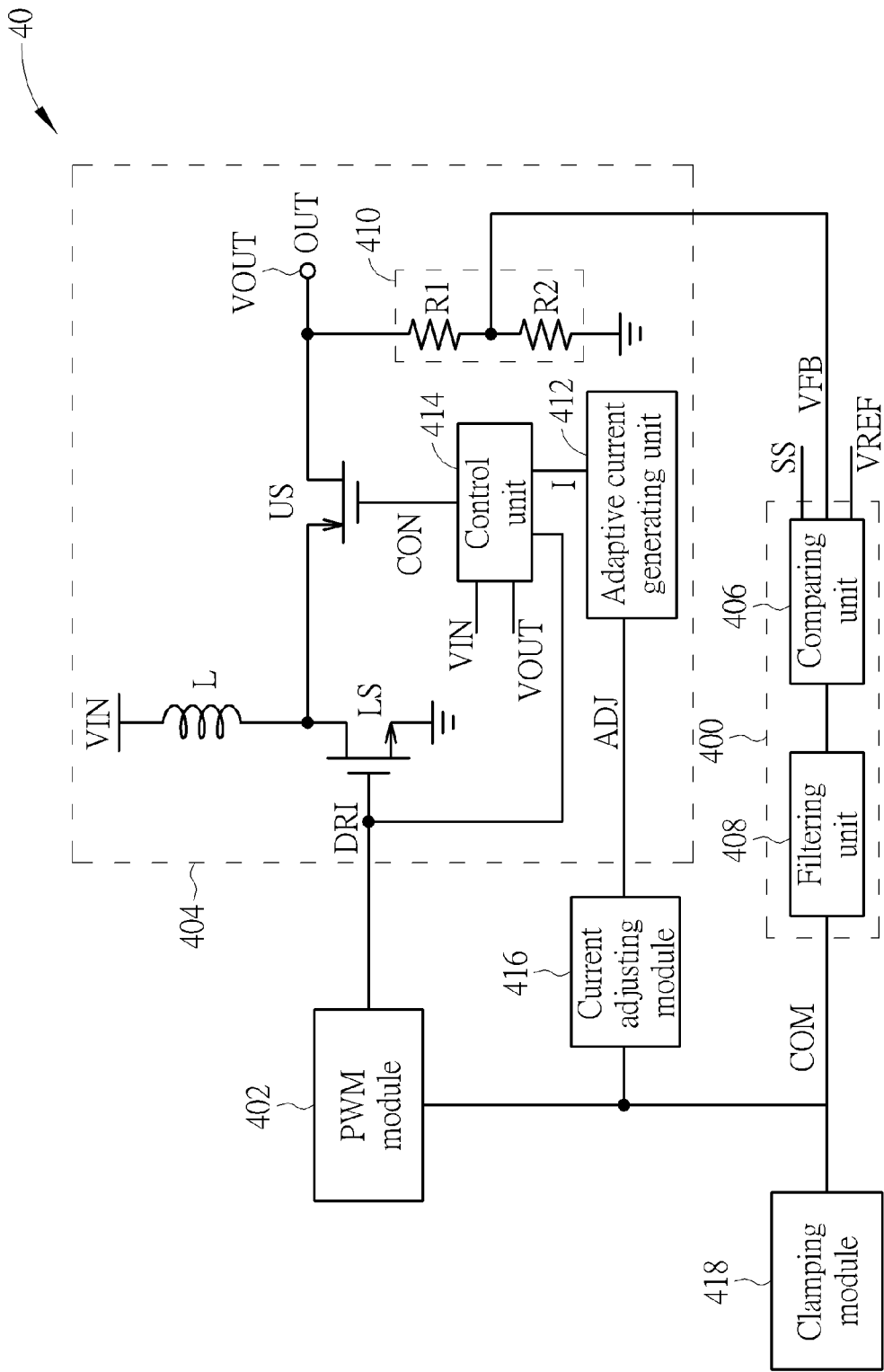
FIG. 4 is a schematic diagram of still another voltage converting device according to an example of the present invention.

Please note that, the above examples utilize the comparing signal, which is generated originally in the voltage converting device, to adaptively adjust the charging current used for increasing the output voltage when the voltage device starts operating (e.g. the current signal I shown in FIG. 2). That is, the charging current used for increasing the output voltage when starting operating can be adaptively adjusted, for avoiding the voltage converting device working abnormally due to the heavy loading. According to different applications and design concepts, those with ordinary skill in the art may observe appropriate modifications and alternations. Please refer to FIG. 4, which is a schematic diagram of a voltage converting device 40 according to an example of the present invention. The voltage converting device 40 is similar to the voltage converting device 20 shown in FIG. 2, thus the components and signals with the similar functions use the same symbols. In comparison with the voltage converting device 20 shown in FIG. 2, the voltage converting device 40 adds a clamping module 418. The clamping module 418 is coupled to the feedback module 400 for limiting the comparing signal COM to an upper boundary. Via adding the clamping module 418, the current value of the current signal I indicated by the current adjusting module 416 does not increase unlimitedly. The components of the voltage converting device 40 can avoid being damaged by the excessive current value of the current signal I.

To sum up, the voltage converting device of the above examples adaptively adjust the charging current, which is used for increasing the output voltage of the voltage converting device when the voltage converting device starts operating, via using the comparing signal generated by the existing feedback path in the voltage converting device. The voltage device therefore can avoid working abnormally due to the variation of the loading. In addition, the voltage converting device of the above example can be realized in a simple structure. Moreover, the process of the voltage converting device transits from the pre-charge mode to the PWM mode is stable and the overshoot phenomenon on the output voltage of the voltage converting device can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage converting device, comprising:
 a feedback module, for generating a comparing signal according to a feedback voltage and a reference voltage;
 a pulse-width-modulation module, for generating a driving signal according to comparing signal;
 a voltage converting module comprising:
  a low-side switch for controlling a connection between a node and ground according to driving signal;
  a high-side switch for controlling a connection between the node and an output end according to a control signal;
  an inductor coupled between the node and an input end;
  a feedback voltage generating unit for generating feedback voltage according to an output voltage of output end and a ratio;
  an adaptive current generating unit for generating a current signal according to an adjusting signal; and
  a control unit for selecting driving signal or current signal as the control signal according to output voltage and an input voltage; and
 a current adjusting module for generating the adjusting signal according to the comparing signal.

2. The voltage converting device of claim 1, wherein the control unit selects the current signal as the control signal when the output voltage is smaller than the input voltage.

3. The voltage converting device of claim 1, wherein the control unit selects the driving signal as the control signal when the output voltage is greater than or equal to the input voltage.

4. The voltage converting device of claim 1, wherein the current adjusting module generates the adjusting signal according to the comparing signal for making the current signal proportional to the comparing signal.

5. The voltage converting device of claim 1, wherein the feedback unit further receives a soft-start signal and selects the signal with the smaller voltage of the reference voltage and the soft-start signal to compare with the feedback voltage, for generating the comparing signal.

6. The voltage converting device of claim 1 further comprising:
 a clamping module, coupled to the feedback module for making the comparing signal not exceed a limit.

* * * * *